(No Model.)
H. R. ROWLAND.
NUT LOCK.
No. 563,416. Patented July 7, 1896.
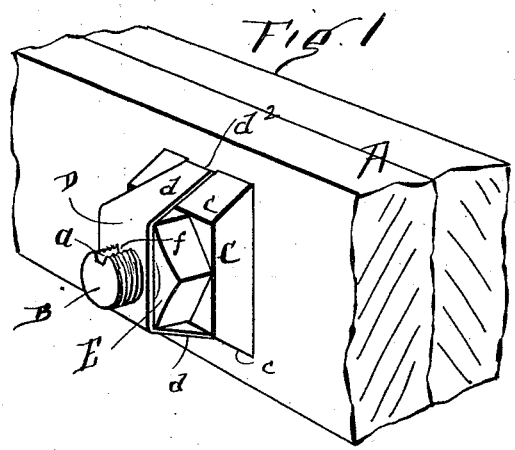
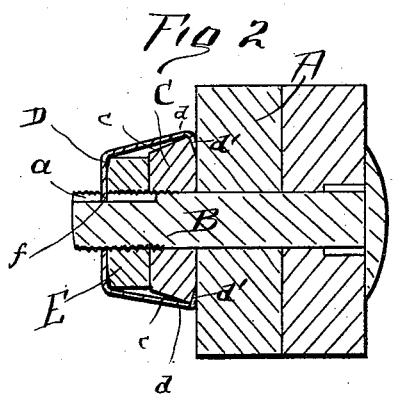
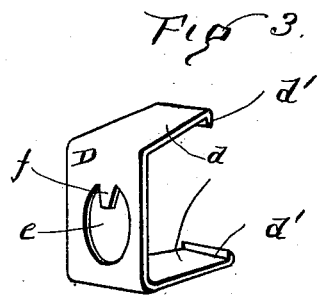
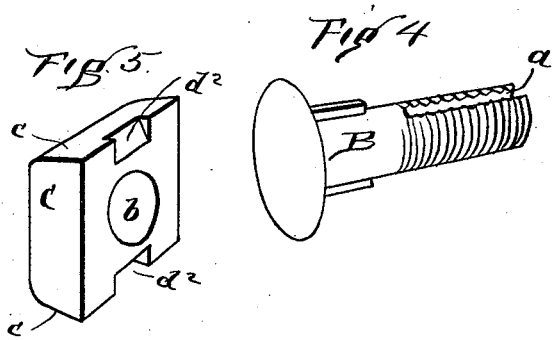
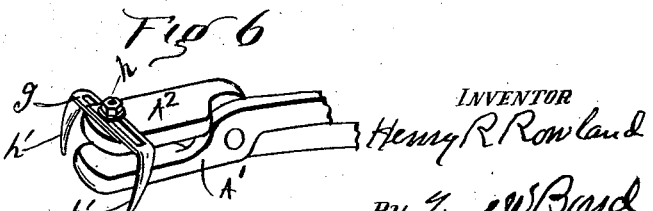
WITNESSES
C. J. Ross
Bertha Finch
INVENTOR
Henry R. Rowland
By Fred W. Bond
ATTORNEY.

UNITED STATES PATENT OFFICE.

HENRY R. ROWLAND, OF CANTON, OHIO.

NUT-LOCK.

SPECIFICATION forming part of Letters Patent No. 563,416, dated July 7, 1896.

Application filed December 20, 1895. Serial No. 572,725. (No model.)

*To all whom it may concern:*

Be it known that I, HENRY R. ROWLAND, a citizen of the United States, residing at Canton, in the county of Stark and State of Ohio, have invented certain new and useful Improvements in Nut-Locks; and I do hereby declare that the following is a full, clear, and exact description of the same, reference being had to the annexed drawings, making a part of this specification, and to the letters of reference marked thereon, in which—

Figure 1 is a view showing the nut properly placed upon a bolt and locked. Fig. 2 is a vertical section. Fig. 3 is a detached view of the locking-cap. Fig. 4 is a detached view of the bolt. Fig. 5 is a detached view of the washer. Fig. 6 is a view of the locking-cap-removing device.

The present invention has relation to nut-locks; and it consists in the different parts and combination of parts hereinafter described, and particularly pointed out in the claim.

Similar letters of reference indicate corresponding parts in all the figures of the drawings.

In the accompanying drawings, A represents the parts designed to be clamped, which may be the ordinary fish-plates or railway-rails, or other devices designed to be clamped together.

The bolt B is constructed in the ordinary manner, except that it is provided with the longitudinal groove $a$, which longitudinal groove may be extended the entire length of the screw-threaded portion of the bolt; but this is not absolutely necessary, as the object hereinafter described can be carried out without extending the groove the entire length of the screw-threaded portion.

The washer C is substantially of the form shown, and is provided with the aperture $b$, which aperture is preferably formed smooth, so that it can be placed upon the bolt without rotating said washer. The washer C is provided with the inclined faces $c$, which inclined faces are located upon opposite sides of the washers and are for the purpose hereinafter described.

The locking-cap D is substantially of the form shown in Fig. 3, and as shown it is provided with the spring-arms $d$, which spring-arms are provided upon their free ends with the hooks $d'$, which hooks are for the purpose of entering the notches $d^2$, which notches are located upon the back side of the washer C, substantially as illustrated in Fig. 5. For the purpose of holding the locking-cap D against rotation the aperture $e$ is provided with the tongue $f$, which tongue is received into the longitudinal groove $a$, as illustrated in Fig. 1. The washer C is formed of such a size that when the locking-cap D is placed in position the arms $d$ will be spread apart or away from each other by reason of the hooked end of the arms coming in contact with the inclined faces $c$, and when the hooked ends of the arms $d$ have reached the notches $d^2$ they will automatically spring into the notches $d^2$, thereby locking the cap D upon the bolt.

It will be understood that before the locking-cap D is placed in proper position the nut E is to be screwed upon the bolt B, so as to properly clamp the parts designed to be secured together.

It will be understood that the nut E will be held against rotation by reason of the corners or extreme angled portions of the nut striking against the edges of the arms $d$.

The locking-cap D is preferably formed of spring-steel and so constructed that it will normally clamp the washer C. For the purpose of providing a means for removing the locking-cap D the hinged bars A' and A² are provided, and are arranged substantially as shown in Fig. 6. To the bar A² are attached the adjustable plates $g$, which adjustable plates are held in the desired position or proper adjustment by means of the screw $h$. The bars $g$ are each provided with the tapered pins $h$, which tapered pins are so adjusted that one of said pins will come upon each side of the nut E, and when they are forced under the arms $d$ they will spread said arms and release the cap, after which the nut E can be removed.

I have illustrated the device for removing the locking-cap D for the purpose of showing how the locking-cap can be removed.

Having fully described my invention, what I claim as new, and desire to secure by Letters Patent, is—

The combination of the screw-threaded bolt B, provided with the longitudinal groove $a$, the washer C, provided with a non-screw-threaded aperture, and inclined faces and notches located upon the rear portion of the washer, the locking-cap D, provided with the spring-arms $d$, having upon their free ends the hooks $d'$, engaged in the notches in the rear portion of the washer and the tongue $f$, located in the groove in the bolt, and the screw-threaded nut E, located upon the screw-threaded portion of the bolt, substantially as and for the purpose specified.

In testimony that I claim the above I have hereunto set my hand in the presence of two witnesses.

HENRY R. ROWLAND.

Witnesses:
J. A. JEFFERS,
F. W. BOND.